United States Patent
Liu

(10) Patent No.: US 10,630,171 B2
(45) Date of Patent: Apr. 21, 2020

(54) OUTPUT VOLTAGE ADJUSTABLE CIRCUIT, VOLTAGE ADJUSTMENT METHOD AND DISPLAY APPARATUS

(71) Applicant: BOE TECHNOLOGY GROUP CO., LTD, Beijing (CN)

(72) Inventor: Jianfu Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 122 days.

(21) Appl. No.: 15/966,489

(22) Filed: Apr. 30, 2018

(65) Prior Publication Data

US 2019/0115828 A1 Apr. 18, 2019

(30) Foreign Application Priority Data

Oct. 18, 2017 (CN) .......................... 2017 1 0971688

(51) Int. Cl.
| | |
|---|---|
| *H02M 3/06* | (2006.01) |
| *G09G 3/36* | (2006.01) |
| *G09G 3/32* | (2016.01) |
| *H02M 3/156* | (2006.01) |
| *G09G 3/00* | (2006.01) |
| *H04N 5/57* | (2006.01) |

(Continued)

(52) U.S. Cl.
CPC .............. *H02M 3/06* (2013.01); *G09G 3/001* (2013.01); *G09G 3/32* (2013.01); *G09G 3/3696* (2013.01); *H02M 3/156* (2013.01); *G09G 2320/0626* (2013.01); *G09G 2330/021* (2013.01); *H02M 2001/0025* (2013.01); *H04N 5/57* (2013.01); *H04N 5/63* (2013.01)

(58) Field of Classification Search
CPC combination set(s) only.
See application file for complete search history.

(56) References Cited

U.S. PATENT DOCUMENTS

2003/0188202 A1* 10/2003 D'Angelo ................. G06F 1/22
 713/300
2008/0042603 A1* 2/2008 Chen ................. H05K 7/20209
 318/109

(Continued)

FOREIGN PATENT DOCUMENTS

CN 105259965 A 1/2016

OTHER PUBLICATIONS

Richtek, RT8251, 5A, 24V, 570kHz Step-Down Converter, DS8251-00 Jul. 2010, pp. 1-16, www.richteck.com. (Year: 2010).*

(Continued)

*Primary Examiner* — Van N Chow
(74) *Attorney, Agent, or Firm* — Nath, Goldberg & Meyer; Joshua B. Goldberg; Stephanie Majkut

(57) ABSTRACT

The present application provides an output voltage adjustable circuit, a voltage adjustment method and a display apparatus. The output voltage adjustable circuit includes a DC voltage output sub circuit, configured to output a DC voltage. The output voltage adjustable circuit further includes a resistor-adjustable sub circuit, coupled to the DC voltage output sub circuit, and configured to adjust a resistance of a resistor connected to the DC voltage output sub circuit so that a DC voltage output by the DC voltage output sub circuit is adjustable according to the resistance of the resistor connected to the DC voltage output sub circuit.

17 Claims, 1 Drawing Sheet

(51) Int. Cl.
   *H04N 5/63*      (2006.01)
   *H02M 1/00*      (2006.01)

(56) References Cited

U.S. PATENT DOCUMENTS

2015/0038858 A1* 2/2015 Ariga .................. A61B 5/0225
                                                    600/490
2017/0155315 A1* 6/2017 Yasusaka ................ G05F 1/468

OTHER PUBLICATIONS

First Office Action dated Jul. 2, 2019; Corresponding to Chinese Application No. 201710971688.1; English Translation Attached.

* cited by examiner

OUTPUT VOLTAGE ADJUSTABLE CIRCUIT, VOLTAGE ADJUSTMENT METHOD AND DISPLAY APPARATUS

CROSS-REFERENCE TO RELATED APPLICATION

This application claims the benefit of priority to Chinese Patent Application No. 201710971688.1 filed on Oct. 18, 2017, the contents of which are incorporated herein in their entirety by reference.

TECHNICAL FIELD

The present disclosure relates to the field of display technology, and particularly relates to an output voltage adjustable circuit, a voltage adjustment method and a display apparatus.

BACKGROUND

At present, different sizes of liquid crystal screens requires different DC supply voltages. For example, the DC supply voltages for different sizes of liquid crystal screens may include 12V, 5V and 3.3V.

SUMMARY

According to embodiments of the present disclosure, an output voltage adjustable circuit, a voltage adjustment method and a display apparatus are provided.

The output voltage adjustable circuit provided in the present disclosure includes: a direct current (DC) voltage output sub circuit, configured to output a DC voltage; and a resistor-adjustable sub circuit, coupled to the DC voltage output sub circuit, and configured to adjust a resistance of a resistor connected to the DC voltage output sub circuit so that a DC voltage output by the DC voltage output sub circuit is adjustable according to the resistance of the resistor connected to the DC voltage output sub circuit.

Optionally, the resistor-adjustable sub circuit includes a resistor circuit and an adjustment control circuit, the resistor circuit is coupled to the adjustment control circuit and configured to provide the resistor connected to the DC voltage output sub circuit, and the adjustment control circuit is configured to adjust and control the resistance of the resistor connected to the DC voltage output sub circuit and provided by the resistor circuit.

Optionally, the resistor circuit includes a fixed resistor and a variable resistor, a first terminal of the fixed resistor is coupled to a first terminal of the variable resistor, a second terminal of the fixed resistor is coupled to an output terminal of the DC voltage output sub circuit, and a second terminal of the variable resistor is grounded.

Optionally, the variable resistor includes a digital potentiometer.

Optionally, the digital potentiometer includes a MAX5401 chip, a first terminal for resistance output of the MAX5401 chip is coupled to the first terminal of the fixed resistor, and a second terminal for resistance output of the MAX5401 chip is grounded.

Optionally, the adjustment control circuit is configured to output different digital control signals to the digital potentiometer to adjust an output resistance of the digital potentiometer.

Optionally, the adjustment control circuit includes a microprocessor.

Optionally, the adjustment control circuit includes a single chip microcomputer.

Optionally, the adjustment control circuit outputs the digital control signals to the digital potentiometer via SPI bus.

Optionally, the DC voltage output sub circuit includes a synchronous step-down DC/DC converter.

Optionally, the synchronous step-down DC/DC converter includes an RT8251 chip having a feedback input terminal coupled to the first terminal of the fixed resistor and the first terminal of the variable resistor.

Optionally, a magnitude of a voltage fed back to the RT8251 chip via the feedback input terminal of the RT8251 chip is changed by changing a resistance of the variable resistor, so as to change a magnitude of a DC voltage output from an output terminal of the RT8251 chip.

Optionally, the output voltage adjustable circuit is configured to provide different DC voltages to different sizes of display screens.

Optionally, the output voltage adjustable circuit is coupled to a cooling fan and configured to provide different supply voltages to the cooling fan to control a rotating speed of the cooling fan.

Optionally, the output voltage adjustable circuit is coupled to an LED lamp and configured to provide different voltages to the LED lamp to control brightness of the LED lamp.

The present disclosure further provides a display apparatus including the above output voltage adjustable circuit.

Optionally, the display apparatus further includes a display screen, an output terminal of the DC voltage output sub circuit of the output voltage adjustable circuit is coupled to a power input terminal of the display screen, and the output voltage adjustable circuit is configured to provide a DC voltage to the display screen according to a size of the display screen.

The present disclosure further provides a voltage adjustment method using the above output voltage adjustable circuit, including: outputting a DC voltage by the DC voltage output sub circuit; and adjusting, by the resistor-adjustable sub circuit, a resistance of a resistor connected to the DC voltage output sub circuit so that the DC voltage output sub circuit outputs a DC voltage that is adjustable according to the resistance of the resistor connected to the DC voltage output sub circuit.

Optionally, the resistor-adjustable sub circuit includes a resistor circuit and an adjustment control circuit, the adjustment control circuit includes a microprocessor or a single chip microcomputer, and the resistor circuit includes a variable resistor including a digital potentiometer; and the microprocessor or the single chip microcomputer outputs different digital control signals to the digital potentiometer via SPI bus, and the different digital control signals control the digital potentiometer to output different resistances.

DETAILED DESCRIPTION

To make those skilled in the art better understand the technical solutions of the present disclosure, an output voltage adjustable circuit, a voltage adjustment method and a display apparatus provided in the present disclosure will be further described in detail below in conjunction with the accompanying drawings and the specific implementations.

In order to reduce the design and preparation costs of a power supply board, power may be supplied to liquid crystal screens of different sizes by a same power supply board. Typically, a large-sized liquid crystal screen requires, for example, a 12V DC power supply, which can be directly supplied from an external 12V power source; a medium-sized liquid crystal screen requires, for example, a 5V DC power supply, which is generally implemented by converting a 12V DC voltage to a 5V DC voltage through a DC/DC converter in practical applications; a small-sized liquid crystal screen requires, for example, a 3.3V DC power supply, which can be implemented by the same method as the 5V DC power supply, that is, by converting a 12V DC voltage to a 3.3V DC voltage through a DC/DC converter. If one power supply board needs to switch among different supply voltages, it is often necessary to additionally provide some output voltage selection circuits on the power supply board, for example, selection among different output voltages on one power supply board can be implemented through a jumper cap selection circuit.

Inventors found that there are many components in the above power supply board, the probability of failure of various components is also high, which causes the above power supply to have large instability and unreliability when supplying power. In addition, the above power supply has high design and fabrication costs.

Thus, the present disclosure aims to provide a stable and reliable power supply, which has low design and fabrication costs and can output various different DC voltages.

Figure 1:
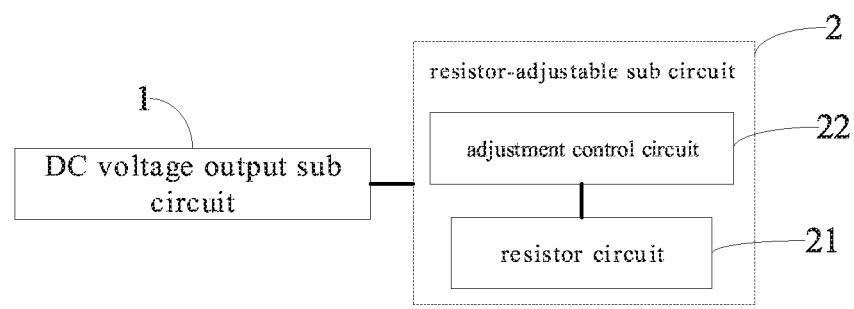
FIG. 1 is a schematic block diagram of an output voltage adjustable circuit according to an embodiment of the present disclosure.

Embodiments of the present disclosure provide an output voltage adjustable circuit. As shown in FIG. 1, the output voltage adjustable circuit includes a DC voltage output sub circuit 1 configured to output a DC voltage; and a resistor-adjustable sub circuit 2 coupled to the DC voltage output sub circuit 1 and configured to adjust a resistance of a resistor connected to the DC voltage output sub circuit 1 so that a DC voltage output by the DC voltage output sub circuit 1 is adjustable according to the resistance of the resistor connected to the DC voltage output sub circuit 1.

By providing the resistor-adjustable sub circuit 2, the resistance of the resistor connected to the DC voltage output sub circuit 1 can be adjusted automatically, so that the DC voltage output by the DC voltage output sub circuit 1 can be adjusted automatically, and the output voltage adjustable circuit thus can output a DC voltage having an adjustable magnitude. Compared to the DC power supply circuit in the related art, the output voltage adjustable circuit according to the embodiments of the present disclosure has less components, improved stability and reliability in power supply, and reduced design and fabrication costs.

In some embodiments, the resistor-adjustable sub circuit 2 includes a resistor circuit 21 and an adjustment control circuit 22, the resistor circuit 21 is coupled to the adjustment control circuit 22 and configured to provide the resistor connected to the DC voltage output sub circuit 1, and the adjustment control circuit 22 is configured to adjust and control the resistance of the resistor connected to the DC voltage output sub circuit 1 and provided by the resistor circuit 21. The adjustment control circuit 22 can adjust the resistance of the resistor connected to the DC voltage output sub circuit 1 and provided by the resistor circuit 21 intelligently and automatically, so that the resistance value of the resistor connected to the DC voltage output sub circuit 1 and provided by the resistor circuit 21 can be changed.

Figure 2:
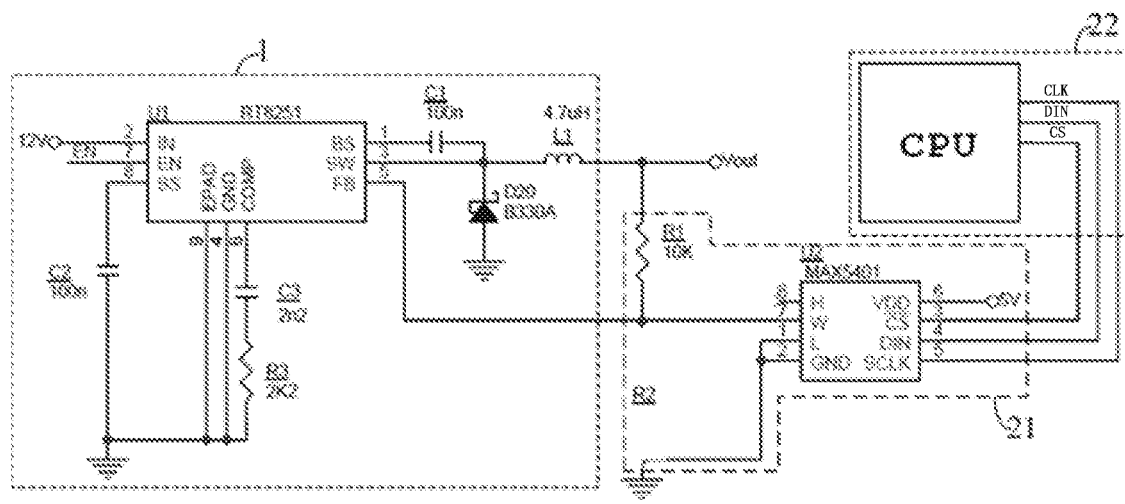
FIG. 2 is a circuit diagram of an output voltage adjustable circuit according to an embodiment of the present disclosure.

In some embodiments, as shown in FIG. 2, the resistor circuit 21 includes a fixed resistor R1 and a variable resistor R2, a first terminal of the fixed resistor R1 is coupled to a first terminal of the variable resistor R2, a second terminal of the fixed resistor R1 is coupled to an output terminal $V_{out}$ of the DC voltage output sub circuit 1, and a second terminal of the variable resistor R2 is grounded.

In some embodiments, the variable resistor R2 includes a digital potentiometer U2. In an embodiment, the digital potentiometer U2 includes a MAX5401 chip, a first terminal W for resistance output of the MAX5401 chip is coupled to the first terminal of the fixed resistor R1, and a second terminal L for resistance output of the MAX5401 chip is grounded. In an embodiment, the variable resistor R2 has a resistance output between the second terminal L and the first terminal W of the MAX5401 chip. In some embodiments, the adjustment control circuit 22 includes a microprocessor or a single chip microcomputer, and is configured to output different digital control signals to the digital potentiometer U2 to adjust an output resistance of the digital potentiometer U2.

It should be noted that the variable resistor R2 may also have a resistance output between a third terminal H and the first terminal W of the MAX5401 chip. Furthermore, as shown in FIG. 2, a chip select input terminal CS, a serial data input terminal DIN and a clock signal input terminal SCLK of the MAX5401 chip are coupled to a chip select output terminal CS, a serial data output terminal DIN and a clock signal output terminal CLK of the microprocessor or the single chip microcomputer, respectively and correspondingly, and are configured to receive a SPI bus signal (i.e., a digital control signal) transmitted by the microprocessor or the single chip microcomputer, so as to adjust the output resistance of the digital potentiometer U2.

Furthermore, it should be noted that, the digital potentiometer may include other chip, as long as the chip can output a variable resistance under the control of the adjustment control circuit 22.

In some embodiments, the DC voltage output sub circuit 1 includes a synchronous step-down DC/DC converter U1. In an embodiment, the synchronous step-down DC/DC converter U1 includes an RT8251 chip having a feedback input terminal FB coupled to the first terminal of the fixed resistor R1 and the first terminal of the variable resistor R2. The feedback input terminal FB of the RT8251 chip outputs a DC voltage, and a magnitude of a voltage fed back to the RT8251 chip via the feedback input terminal FB of the RT8251 chip can be changed by changing a resistance of the variable resistor R2, so as to change a magnitude of the DC voltage output from an output terminal of the RT8251 chip. As shown in FIG. 2, the output voltage of the DC voltage output sub circuit 1 can be calculated according to the following formula: $V_{out}=V_{FB}(1+R1/R2)$, where $V_{FB}$ is a voltage of the feedback input terminal FB.

In addition, it should be noted that the RT8251 chip is coupled to conventional peripheral circuits. For example, a soft start control input terminal SS of the RT8251 chip is coupled to a capacitor C2 having a grounded terminal; a power switch output terminal SW of the RT8251 chip is coupled to one terminal of an inductor L1, and the other terminal of the inductor L1 is the output terminal $V_{out}$ of the RT8251 chip; a compensation node COMP of the RT8251 chip is coupled to a capacitor C3 and a resistor R3 that are coupled in series; a bootstrap voltage terminal BS of the RT8251 chip is coupled to a capacitor C1 and a diode D20 that are coupled in series. Specific contents of the peripheral circuits of the RT8251 chip are not repeated here.

In some embodiments, the adjustment control circuit 22 outputs a digital control signal to the digital potentiometer U2 via SPI bus. For example, the microprocessor or the single chip microcomputer can output different digital control codes to the digital potentiometer U2 via SPI bus, so that the digital potentiometer U2 outputs resistances having different values according to the different digital control codes.

In some embodiments, the output voltage adjustable circuit is configured to provide different DC voltages to different sizes of display screens.

In some embodiments, the output voltage adjustable circuit is coupled to a cooling fan and configured to provide different supply voltages to the cooling fan to control a rotating speed of the cooling fan.

In some embodiments, the output voltage adjustable circuit is coupled to an LED lamp and configured to provide different voltages to the LED lamp to control brightness of the LED lamp.

In the output voltage adjustable circuit according to the embodiments of the present disclosure, because the synchronous step-down DC/DC converter (e.g., RT8251 chip) has stable output current carrying capacity and the digital potentiometer has high resistance adjustment accuracy, it is ensured that the voltage output by the DC voltage output sub circuit has high accuracy and the entire output voltage adjustable circuit has high reliability and low heat generation.

Based on the above output voltage adjustable circuit according to the embodiments of the present disclosure, embodiments of the present disclosure further provide a voltage adjustment method using the output voltage adjustable circuit. The voltage adjustment method includes: outputting a DC voltage by the DC voltage output sub circuit; and adjusting, by the resistor-adjustable sub circuit, a resistance of a resistor connected to the DC voltage output sub circuit so that the DC voltage output sub circuit outputs a DC voltage that is adjustable according to the resistance of the resistor connected to the DC voltage output sub circuit.

In some embodiments, the adjustment control circuit of the resistor-adjustable sub circuit includes a microprocessor or a single chip microcomputer, the variable resistor of the resistor circuit of the resistor-adjustable sub circuit includes a digital potentiometer; the microprocessor or the single chip microcomputer outputs different digital control signals to the digital potentiometer via SPI bus, and the different digital control signals control the digital potentiometer to output different resistances.

In the output voltage adjustable circuit according to the embodiments of the present disclosure, by providing the resistor-adjustable sub circuit, the resistance of the resistor connected to the DC voltage output sub circuit can be adjusted automatically, so that the DC voltage output by the DC voltage output sub circuit can be adjusted automatically, and the output voltage adjustable circuit thus can output a DC voltage having an adjustable magnitude. Compared to the DC power supply circuit in the related art, the output voltage adjustable circuit according to the embodiments of the present disclosure has less components, improved stability and reliability in power supply, and reduced design and fabrication costs.

Embodiments of the present disclosure provide a display apparatus including the output voltage adjustable circuit described in the present disclosure.

According to the embodiments of the present disclosure, the display apparatus further includes a display screen, the output terminal of the DC voltage output sub circuit of the output voltage adjustable circuit is coupled to a power input terminal of the display screen, and the output voltage adjustable circuit is configured to provide a DC voltage to the display screen according to a size of the display screen.

Because different sizes of display screens require different DC supply voltages, by adopting the output voltage adjustable circuit according to the embodiments of the present disclosure, the supply voltage requirements of various different sizes of display apparatuses can be met, and thus, there is no need to provide a complex power supply circuit inside the display apparatus, which in turn not only reduces power supply cost of the display apparatus but also improves the stability and reliability in power supply of the display apparatus.

The display apparatus according to the embodiments of the present disclosure may be any product or component with a display function, such as a liquid crystal panel, a liquid crystal television, an OLED panel, an OLED television, a display, a mobile phone, a navigator or the like.

It could be understood that the above embodiments are merely exemplary embodiments adopted for describing the principle of the present disclosure, but the present disclosure is not limited thereto. Various variations and improvements may be made by those of ordinary skill in the art without departing from the spirit and essence of the present disclosure, and these variations and improvements shall also be regarded as falling into the protection scope of the present disclosure.

The invention claimed is:

1. An output voltage adjustable circuit, comprising:
   a direct current (DC) voltage output sub circuit, configured to output a DC voltage; and
   a resistor-adjustable sub circuit, coupled to the DC voltage output sub circuit, and configured to adjust a resistance of a resistor connected to the DC voltage output sub circuit so that the DC voltage output by the DC voltage output sub circuit is adjustable according to the resistance of the resistor connected to the DC voltage output sub circuit,
   wherein the resistor-adjustable sub circuit comprises a resistor circuit and an adjustment control circuit, the resistor circuit comprises a fixed resistor and a variable resistor, the adjustment control circuit is configured to adjust and control the variable resistor, the fixed resistor is coupled between an output terminal and a feedback terminal of the DC voltage output sub circuit, the variable resistor is coupled between the feedback terminal of the DC voltage output sub circuit and ground, and the DC voltage output from the DC voltage output sub circuit is in direct proportion to a resistance ratio of the fixed resistor and the variable resistor.

2. The output voltage adjustable circuit of claim 1, wherein the variable resistor comprises a digital potentiometer.

3. The output voltage adjustable circuit of claim 2, wherein the digital potentiometer comprises a MAX5401 chip, a first terminal for resistance output of the MAX5401 chip is coupled to the first terminal of the fixed resistor, and a second terminal for resistance output of the MAX5401 chip is grounded.

4. The output voltage adjustable circuit of claim 2, wherein the adjustment control circuit is configured to output different digital control signals to the digital potentiometer to adjust an output resistance of the digital potentiometer.

5. The output voltage adjustable circuit of claim 4, wherein the adjustment control circuit comprises a microprocessor.

6. The output voltage adjustable circuit of claim 4, wherein the adjustment control circuit comprises a single chip microcomputer.

7. The output voltage adjustable circuit of claim 4, wherein the adjustment control circuit outputs the digital control signals to the digital potentiometer via SPI bus.

8. The output voltage adjustable circuit of claim 1, wherein the DC voltage output sub circuit comprises a synchronous step-down DC/DC converter.

9. The output voltage adjustable circuit of claim 8, wherein the synchronous step-down DC/DC converter comprises an RT8251 chip having a feedback input terminal coupled to the first terminal of the fixed resistor and the first terminal of the variable resistor.

10. The output voltage adjustable circuit of claim 9, wherein a magnitude of a voltage fed back to the RT8251 chip via the feedback input terminal of the RT8251 chip is changed by changing a resistance of the variable resistor, so as to change a magnitude of a DC voltage output from an output terminal of the RT8251 chip.

11. The output voltage adjustable circuit of claim 1, wherein the output voltage adjustable circuit is configured to provide different DC voltages to different sizes of display screens.

12. The output voltage adjustable circuit of claim 1, wherein the output voltage adjustable circuit is coupled to a cooling fan and configured to provide different supply voltages to the cooling fan to control a rotating speed of the cooling fan.

13. The output voltage adjustable circuit of claim 1, wherein the output voltage adjustable circuit is coupled to an LED lamp and configured to provide different voltages to the LED lamp to control brightness of the LED lamp.

14. A display apparatus, comprising the output voltage adjustable circuit of claim 1.

15. The display apparatus of claim 14, further comprising a display screen, wherein an output terminal of the DC voltage output sub circuit of the output voltage adjustable circuit is coupled to a power input terminal of the display screen, and the output voltage adjustable circuit is configured to provide a DC voltage to the display screen according to a size of the display screen.

16. A voltage adjustment method using the output voltage adjustable circuit of claim 1, comprising:
 outputting a DC voltage by the DC voltage output sub circuit; and
 adjusting, by the resistor-adjustable sub circuit, a resistance of a resistor connected to the DC voltage output sub circuit so that the DC voltage output sub circuit outputs a DC voltage that is adjustable according to the resistance of the resistor connected to the DC voltage output sub circuit.

17. The voltage adjustment method of claim 16, wherein the resistor-adjustable sub circuit comprises a resistor circuit and an adjustment control circuit, the adjustment control circuit comprises a microprocessor or a single chip microcomputer, and the resistor circuit comprises a variable resistor comprising a digital potentiometer; and
 the microprocessor or the single chip microcomputer outputs different digital control signals to the digital potentiometer via SPI bus, and the different digital control signals control the digital potentiometer to output different resistances.

* * * * *